(12) United States Patent
Drozdzyk et al.

(10) Patent No.: US 10,682,971 B2
(45) Date of Patent: Jun. 16, 2020

(54) MOTOR VEHICLE

(71) Applicant: Bayerische Motoren Werke Aktiengesellschaft, Munich (DE)

(72) Inventors: Dominik Drozdzyk, Wroclaw (PL); Marcel Sieler, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/111,307

(22) Filed: Aug. 24, 2018

(65) Prior Publication Data

US 2018/0361971 A1    Dec. 20, 2018

Related U.S. Application Data

(63) Continuation of application No. PCT/EP2017/053896, filed on Feb. 21, 2017.

(30) Foreign Application Priority Data

Mar. 10, 2016   (DE) .................... 10 2016 203 964

(51) Int. Cl.
*B60R 19/52* (2006.01)
*B60Q 1/26* (2006.01)
(Continued)

(52) U.S. Cl.
CPC ............ *B60R 19/52* (2013.01); *B60Q 1/2607* (2013.01); *B60Q 1/2661* (2013.01);
(Continued)

(58) Field of Classification Search
CPC ...... B60Q 1/2607; B60Q 1/2661; B60Q 1/56; B60R 19/52; B60R 2019/525;
(Continued)

(56) References Cited

U.S. PATENT DOCUMENTS

2008/0043484 A1* 2/2008 Lin ..................... B60Q 1/2661
                                                                   362/511
2013/0293104 A1    11/2013 Wu
(Continued)

FOREIGN PATENT DOCUMENTS

DE       36 00 928 A1    1/1987
DE       103 37 615 B3   4/2005
(Continued)

OTHER PUBLICATIONS

International Search Report (PCT/ISA/210) issued in PCT Application No. PCT/EP2017/053896 dated May 19, 2017 with English translation (six pages).

(Continued)

*Primary Examiner* — Tsion Tumebo
(74) *Attorney, Agent, or Firm* — Crowell & Moring LLP

(57) ABSTRACT

A motor vehicle has a radiator grille with a plurality of mutually spaced lighting elements. In the grille, a baffle is mounted in front of each lighting element in the direction of travel and a reflector unit is associated with each lighting element. The reflector unit is configured and arranged such that light from each lighting element is reflected by the associated reflector unit so that light is emitted through the radiator grille out of the motor vehicle to the exterior.

11 Claims, 5 Drawing Sheets

(51) Int. Cl.
- *F21S 43/237* (2018.01)
- *F21S 43/31* (2018.01)
- *F21S 43/245* (2018.01)
- *F21S 43/40* (2018.01)
- *F21S 43/249* (2018.01)
- *F21S 41/32* (2018.01)
- *B60Q 1/56* (2006.01)

(52) U.S. Cl.
CPC .......... *F21S 41/321* (2018.01); *F21S 43/237* (2018.01); *F21S 43/245* (2018.01); *F21S 43/249* (2018.01); *F21S 43/31* (2018.01); *F21S 43/40* (2018.01); *B60Q 1/56* (2013.01); *B60R 2019/525* (2013.01)

(58) Field of Classification Search
CPC ...... F21S 41/321; F21S 43/237; F21S 43/245; F21S 43/249; F21S 43/31; F21S 43/40
See application file for complete search history.

(56) References Cited

U.S. PATENT DOCUMENTS

| | | | | |
|---|---|---|---|---|
| 2016/0090027 | A1* | 3/2016 | Tanaka | B60Q 1/2661 362/516 |
| 2016/0377254 | A1* | 12/2016 | Thiel | F21S 41/24 362/511 |
| 2017/0050509 | A1* | 2/2017 | Aizawa | B60K 11/085 |

FOREIGN PATENT DOCUMENTS

| | | |
|---|---|---|
| DE | 10 2006 042 648 A1 | 3/2008 |
| DE | 10 2007 018 678 A1 | 10/2008 |
| DE | 20 2012 008 792 U1 | 1/2013 |
| DE | 10 2014 015 185 A1 | 4/2015 |

OTHER PUBLICATIONS

German-language Written Opinion (PCT/ISA/237) issued in PCT Application No. PCT/EP2017/053896 dated May 19, 2017 (five pages).

German-language Search Report issued in counterpart German Application No. 10 2016 203 964.4 dated Oct. 20, 2016 with partial English translation (12 pages).

* cited by examiner

MOTOR VEHICLE

CROSS REFERENCE TO RELATED APPLICATIONS

This application is a continuation of PCT International Application No. PCT/EP2017/053896, filed Feb. 21, 2017, which claims priority under 35 U.S.C. § 119 from German Patent Application No. 10 2016 203 964.4, filed Mar. 10, 2016, the entire disclosures of which are herein expressly incorporated by reference.

BACKGROUND AND SUMMARY OF THE INVENTION

The invention relates to a motor vehicle having a radiator grille.

Various headlamps, indicators, boundary and clearance lamps, license-plate lamps and lamps for the vehicle interior are known for motor vehicles. The arrangement and/or design of the lamps has an important influence on the vehicle design which, in turn, is also decisive for the sales success of a vehicle.

Motor vehicle headlamps, in particular, have recently gained great importance as designed-defining constituent parts of motor vehicles as they are suitable for defining the design of a motor vehicle day and night.

Within the endeavor of further sharpening a vehicle-specific and brand-specific night design, DE 36 009 28 A1 proposed to irradiate the radiator grille of a motor vehicle, which serves as a trademark, with the aid of an additional lamp in order to facilitate an identification of the vehicle at night. This additional lamp is arranged in the outside region of the vehicle, for example on the front bumper. Even though, in principle, this apparatus is suitable for improving the identification value of a vehicle at night, it harbors the disadvantage that dazzling of other road users may be caused both by the additional lamp itself and by the irradiated radiator grille, particularly if the radiator grille, or parts thereof, are chrome plated and/or provided with strongly and well reflecting lacquers. Moreover, the additional lamp can easily get dirty, bringing about an unwanted jagged appearance of the vehicle front.

The invention is now based on the object of providing an improved motor vehicle.

This and other objects are achieved by a motor vehicle according to the invention equipped with a radiator grille that comprises a multiplicity of spaced apart illuminants (lighting elements). A baffle is disposed upstream of each illuminant, in particular in the direction of travel, said baffles preferably preventing direct emission of light from the motor vehicle to the outside.

A reflector unit is assigned to each illuminant. The reflector unit is embodied and arranged in such a way that light of the illuminant or illuminants is reflected in each case by the assigned reflector unit such that light is emitted from the motor vehicle to the outside, in particular out of the motor vehicle, through the radiator grille.

Firstly, this obtains a particularly effective, and hence design-defining and brand-defining, aesthetic effect. Secondly, the merely indirect emission, brought about by the reflector units, prevents other road users from being dazzled by the directly emitted light of the illuminants and ensures that the legal specifications in respect of the exterior illumination of motor vehicles can thus be observed.

The baffles are preferably disposed upstream of the respectively assigned illuminant in substantially the vehicle longitudinal direction in order to largely prevent a direct emission of light by the illuminant in the vehicle longitudinal direction. Within the scope of the invention, "direction of travel" or "vehicle longitudinal direction" is understood to mean, in particular, the "forward direction of travel" or the vehicle longitudinal direction from the vehicle tail to the vehicle front.

The baffles can also be part of a standard radiator grille. They can be produced from different materials, such as steel or a polymer.

The illuminants are preferably embodied with a pronounced elongate extent, in particular in a rod-shaped, lamella-shaped or rib-shaped manner. Particularly preferably, the baffles and/or reflector units also have a rod-shaped, lamella-shaped or rib-shaped embodiment. Here, the length (in each case in the direction of maximum longitudinal extent) of an illuminant preferably deviates from the length (in each case in the direction of maximum longitudinal extent) of an assigned baffle and/or from the length (in each case in the direction of maximum longitudinal extent) of an assigned reflector unit by less than 30%, 20% or 10%.

Particularly in the vehicle longitudinal direction, the reflector units are arranged behind the illuminant, preferably with offset from the illuminants in the vehicle transverse direction. By way of example, a reflector unit or the reflector units are or comprise respectively reflecting faces (surfaces), wherein the reflective property preferably emerges from the material of the faces (surfaces). Preferably, the reflector unit consists of a reflective metal or of a polymer with, for example, chrome or aluminum vapor-deposited thereon. Preferably, the reflector units are diffusely reflective reflector units or reflector units that reflect in scattering fashion.

The distance between illuminants and the reflector unit assigned in each case is preferably greater than the distance between illuminants and the baffle assigned, in particular disposed upstream thereof, in each case, preferably five times greater or ten times greater.

A baffle preferably has a form that at least partly corresponds to the illuminant, and so the illuminant is partly enveloped or surrounded by the baffle, preferably by more than 30%, 40% or 50%. As a result, the shadowing brought about by the baffle is particularly effective. Preferably, the illuminant is also mechanically stabilized and protected by the baffle as a result thereof.

Preferably alternatively, or in addition thereto, a baffle is formed as part of the illuminant and/or preferably carried by the illuminant. By way of example, the baffle is embodied as a lacquering of the illuminant, as a coating of the illuminant, as a surface treatment of the illuminant or as a film carried by the illuminant.

What the aforementioned embodiment variants bring about is that the invention can be implemented easily, effectively and reliably in practice.

In an embodiment of the invention, the illuminants are embodied substantially parallel to one another.

According to another development, the baffles and/or the reflector units are additionally or alternatively embodied substantially parallel to one another.

The distance between adjacent baffles, between adjacent reflector units and between adjacent illuminants is preferably substantially identical.

Preferably, at least two reflector units, or all of the reflector units, are formed in each case by substantially plane faces, wherein, in particular, at least two adjacent reflector units, or all reflector units, are substantially parallel to one another. According to a complementary or alternative embodiment, the reflector units or the tangential planes through the axes of symmetry or through the planes of symmetry of the reflector units in each case include an acute angle with the transverse vehicle axis, said acute angle preferably being less than 45 degrees.

The front side of the radiator grille is preferably defined by the baffles, in particular by the front sides or front edges thereof, optionally together with a radiator grille frame.

In a further development of the invention, the radiator grille comprises or forms at least one frame and the illuminants, the baffles and/or the reflector units are carried by the frame.

Preferably, each illuminant comprises a light guide or is substantially formed by a light guide. Particularly preferably, light is input coupled into the light guides, in each case at one end or at the ends.

Preferably, output coupling of light from the light guide on the side of the light guide facing the associated reflector unit is brought about by prisms, a reflection layer, a scattering layer, a roughened surface or a scattering film on the side of the light guide facing the baffle, or by scattering means in the light guide.

By way of example, the light guide can be formed by an optical fiber bundle, which contain light-scattering particles and which are held together and/or carried by transparent cladding.

An illuminant or each illuminant, in particular light guide, is embodied in such a way that the focus of the light distribution produced thereby points in the direction of the assigned reflector unit or lies on the latter.

Light-emitting diodes are preferably used as a light source, said light-emitting diodes in each case being arranged at an end or the ends of one illuminant or of the illuminants, in particular light guides, in order to couple light into the illuminant, in particular the light guide.

Alternatively, or in addition thereto, an illuminant comprises as a light source at least one electroluminescent sheet or a plurality of light-emitting diodes, which are preferably arranged along an illuminant. Preferably, the illuminants comprise, or are formed by, stripe-shaped OLEDs or LED arrays.

Preferably, the light sources and illuminants are embodied in such a way that the light distribution produced by the illuminants, together with the light distribution of the parking lamps, the low-beam headlamps, the daytime running lamps and/or the near field illumination device, does not exceed the associated limits of the corresponding predetermined light distribution.

In a development of the invention, each baffle is embodied and arranged relative to an illuminant in such a way that the illuminant is not visible from the outside if the engine hood is closed and/or substantially no light of the illuminant is emitted to the outside directly (without reflection) from the motor vehicle, in particular through the radiator grille.

In another development, each reflector unit is embodied and arranged relative to an illuminant in such a way that light of an illuminant if the engine hood is closed is emitted to the outside indirectly from the motor vehicle, in particular through the radiator grille, by virtue of light of the illuminant being deflected by the associated reflector unit in such a way that said light is emitted to the outside through the interstice that lies between the illuminant and an adjacent illuminant.

According to a preferred embodiment, the reflector unit of an illuminant (the reflector unit is functionally assigned to the illuminant) and the baffle of an adjacent illuminant are directly connected to one another, in particular in an interlocking, force-fit or integrally bonded manner, or they have an integral embodiment. This facilitates a stable and cost-effective implementation of the invention in practice. Preferably, only the portion of the common component that should act as a reflector unit has a reflective embodiment (for example as a result of a piecewise surface treatment, lacquering or a vapor deposition). Particularly preferably, the baffle and the main body of the reflector unit consist of the same material in this case.

In a further development of the invention, the baffles and/or the reflector units are embodied as air deflectors, in particular in such a way that they are suitable for guiding air through the radiator grille into the engine compartment of the motor vehicle.

As a result, the technical function of the radiator grille is supported by the components that realize the luminous function. Preferably, the outside faces of the baffles and/or the reflector units are embodied as air deflectors in such a way that incoming outside air is guided into the engine compartment in a targeted fashion and in an expedient fashion in terms of flow.

Preferably, the radiator grille comprises two partial units, which are embodied and arranged symmetrically to one another.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
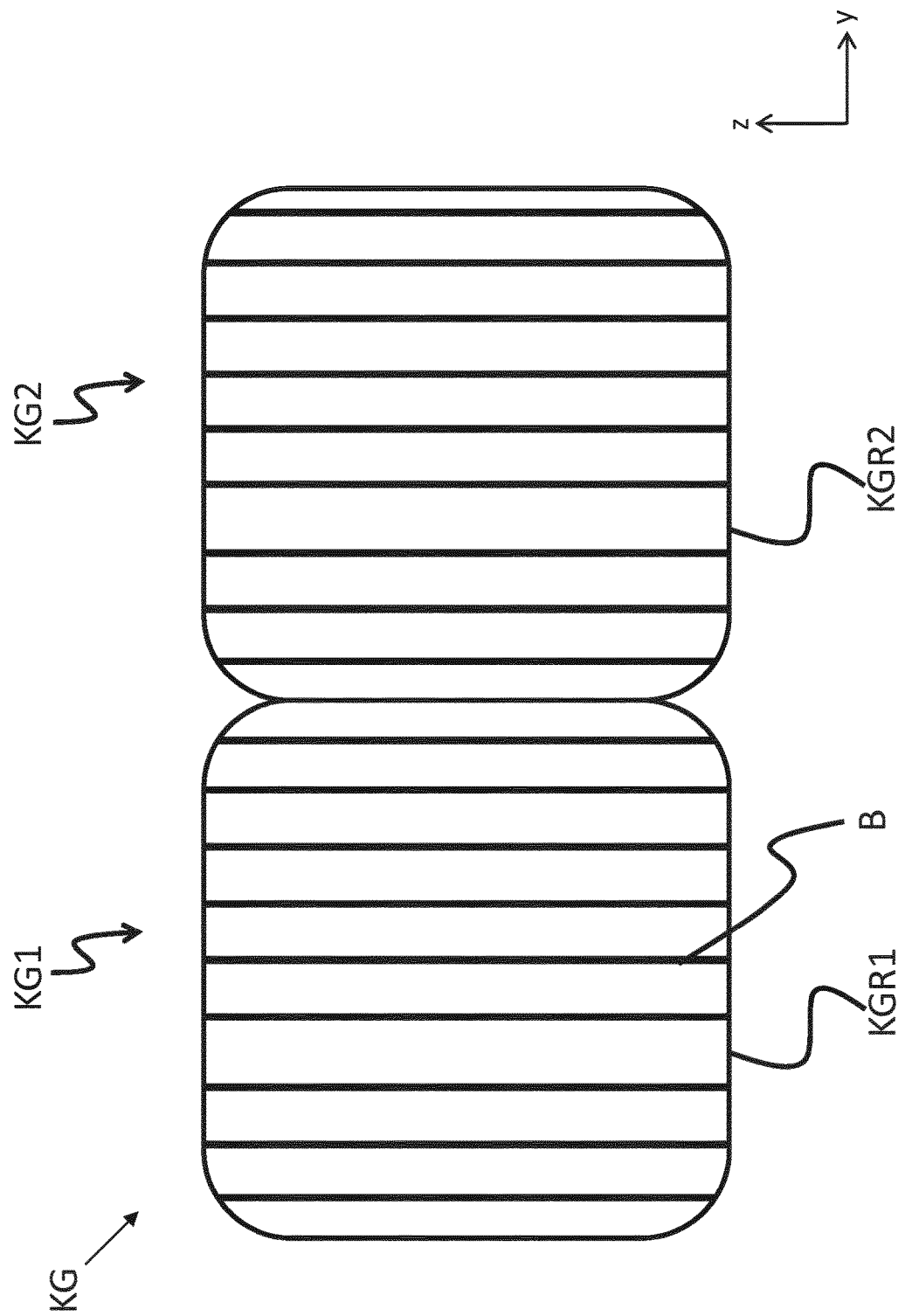
FIG. 1 is a schematic diagram of the principle of a radiator grille.

FIG. 1 shows a radiator grille KG of a motor vehicle from the front (an observer is standing in front of the vehicle and looks at the vehicle). The radiator grille consists of two partial radiator grills KG1, KG2 that are symmetrical in relation to one another. Each partial radiator grille KG1, KG2 comprises a partial radiator grille frame KGR1, KGR2, each of which carry a plurality of illuminants that extend vertically and parallel to one another.

The illuminants are not visible in the figure as they are covered by the upstream baffles B. Depending on the embodiment, all, or else only some, of the illustrated vertically extending lamellas can be formed by baffles and/or illuminants. The remaining lamellas can be embodied as "normal" or conventional radiator grille lamellas that do not cover an active lighting apparatus.

The reflector units are not illustrated in this figure for simplification purposes.

Figure 2:
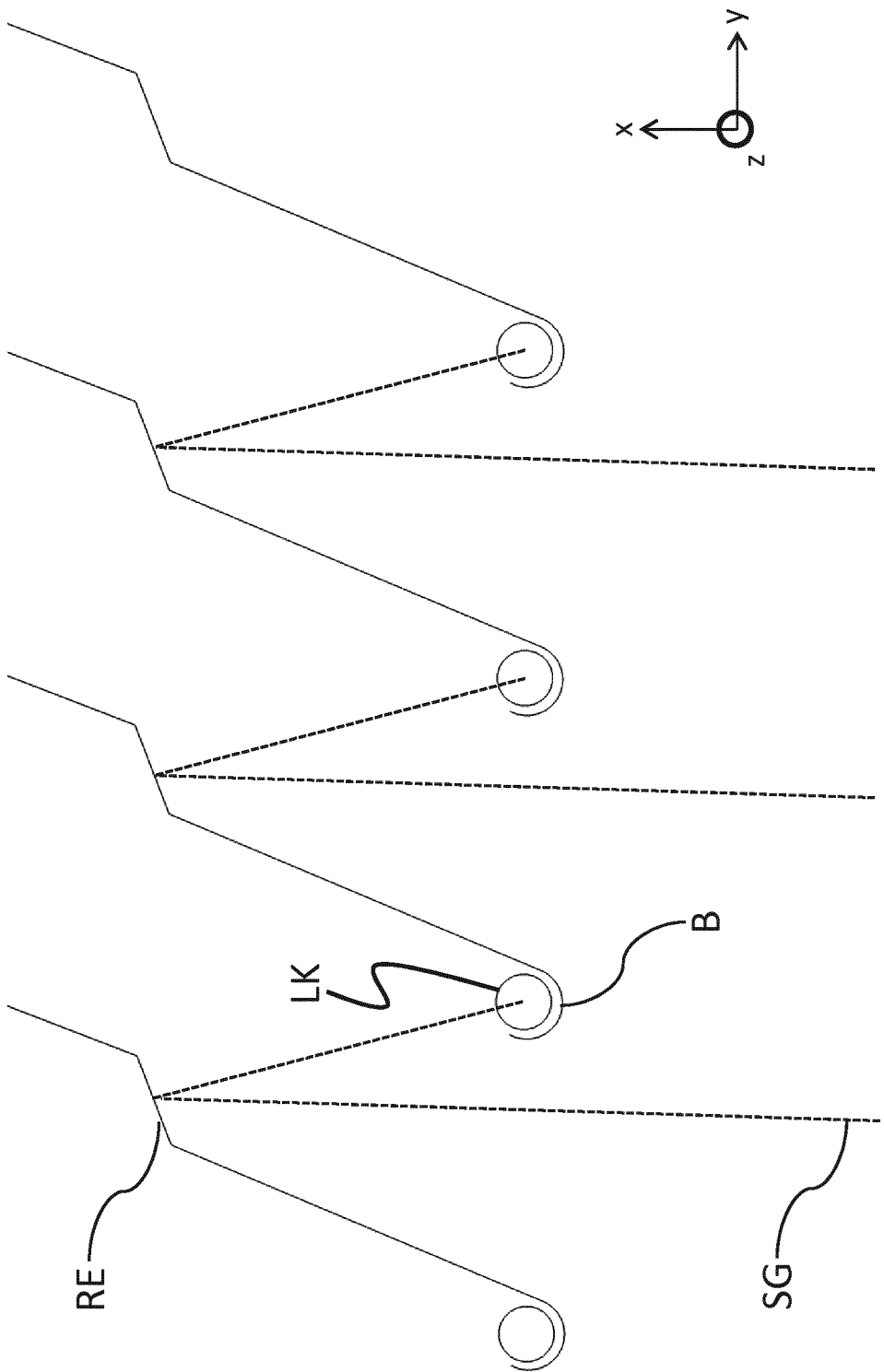
FIGS. 2 to 5 show, in cross sections, simplified schematic diagrams of a plurality of illuminants with associated baffles and reflector units.

FIG. 2 shows a sectional illustration of a multiplicity of spaced apart illuminants LK, which are carried by a frame of a radiator grille which is not illustrated here.

A baffle B is disposed upstream of each illuminant LK in the vehicle longitudinal direction or direction of travel (negative x-direction in this case). A reflector unit RE is assigned to each illuminant LK, said reflector unit reflecting the light emitted by the illuminant LK in such a way in accordance with the beam path SG illustrated in a simplified manner that light is emitted out of the motor vehicle to the outside through the radiator grille, substantially in the vehicle longitudinal direction or direction of travel (negative x-direction in this case).

By way of example, the illuminants LK are rod-shaped light guides, the longitudinal extent of which lies in the z-direction. Preferably, the reflector units RE are formed, in each case, by a substantially plane reflector face or reflector plane. The reflector faces are preferably substantially parallel to one another.

Figure 3:
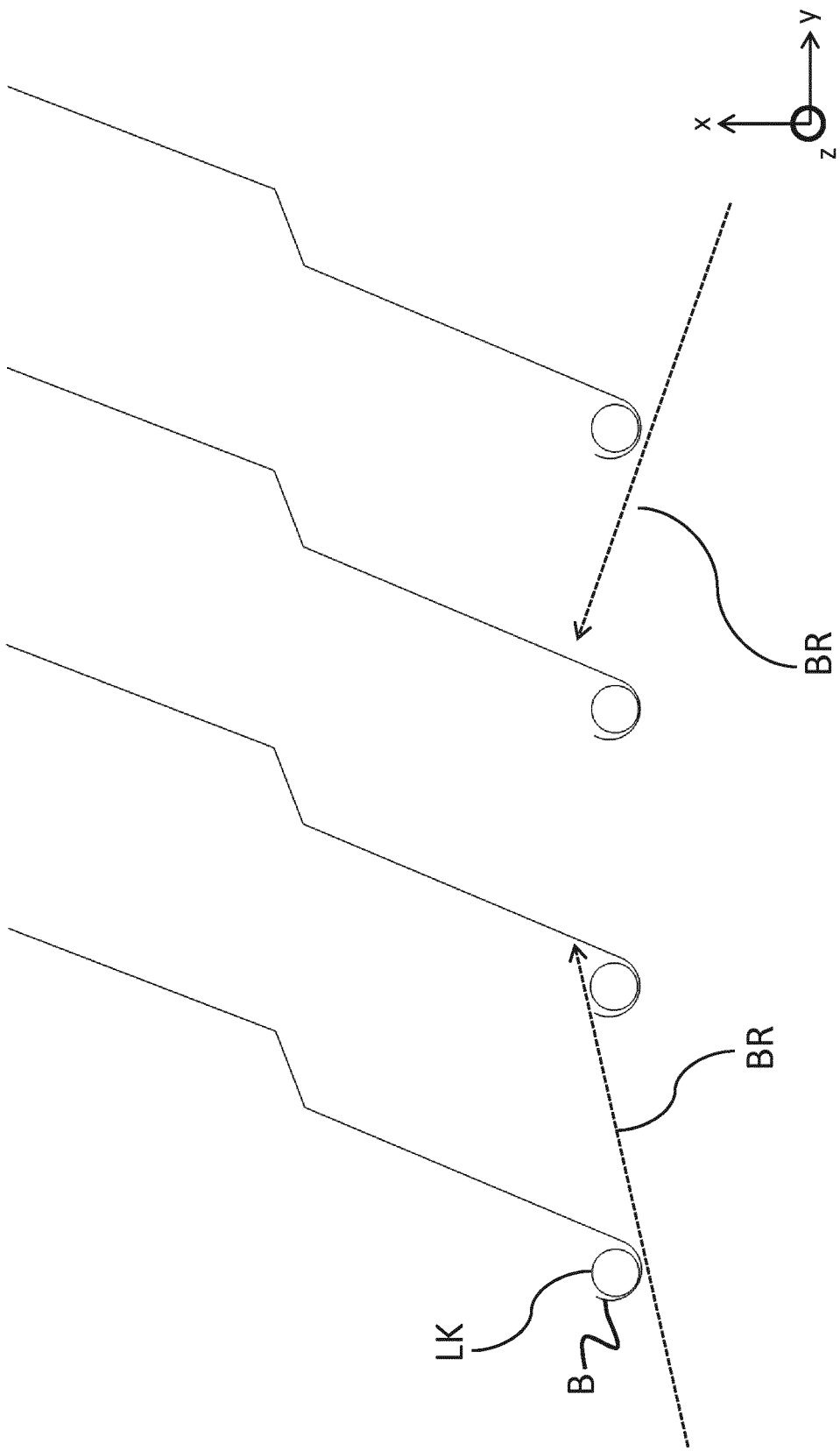

As shown in FIG. 3, the illuminants LK and the baffles B are embodied and arranged in such a way that there is no direction of view BR for an observer situated outside of the motor vehicle that would facilitate a direct line of sight to an illuminant LK. This prevents dazzling of other road users, and legal specifications are observed.

Figure 4:
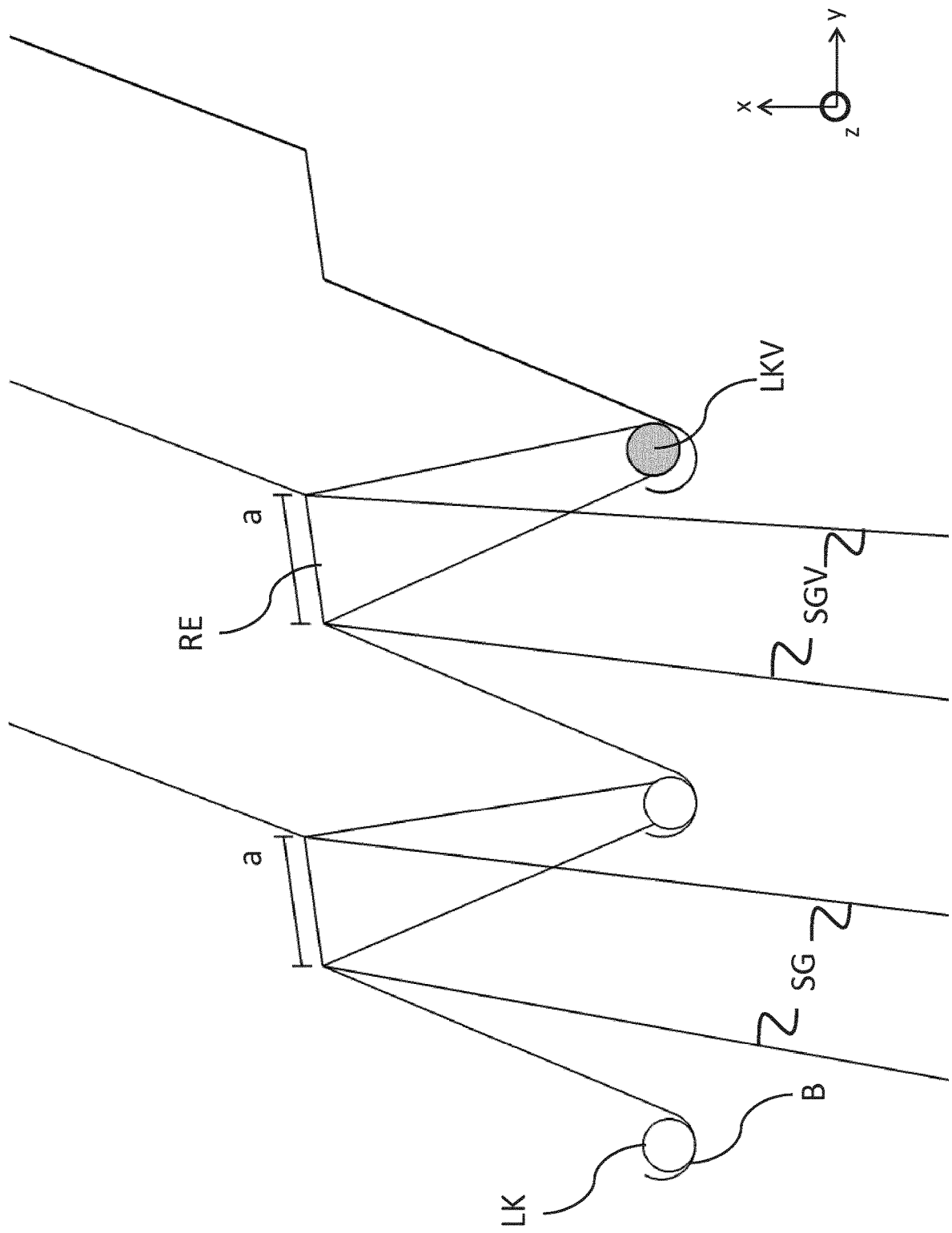

A further advantage of the invention is elucidated on the basis of FIG. 4. In the present example, an illuminant LKV has been wholly or partly displaced from its original position on account of a mechanical influence, for example. Such a displacement of a directly visible illuminant that is arranged parallel to a multiplicity of further illuminants would bother an observer. Although the invention causes a change in the beam path SGV as a result of the displacement of the illuminant LKV, this displacement is hardly perceivable to an observer, also because of the indirect emission via the reflector unit RE.

Figure 5:
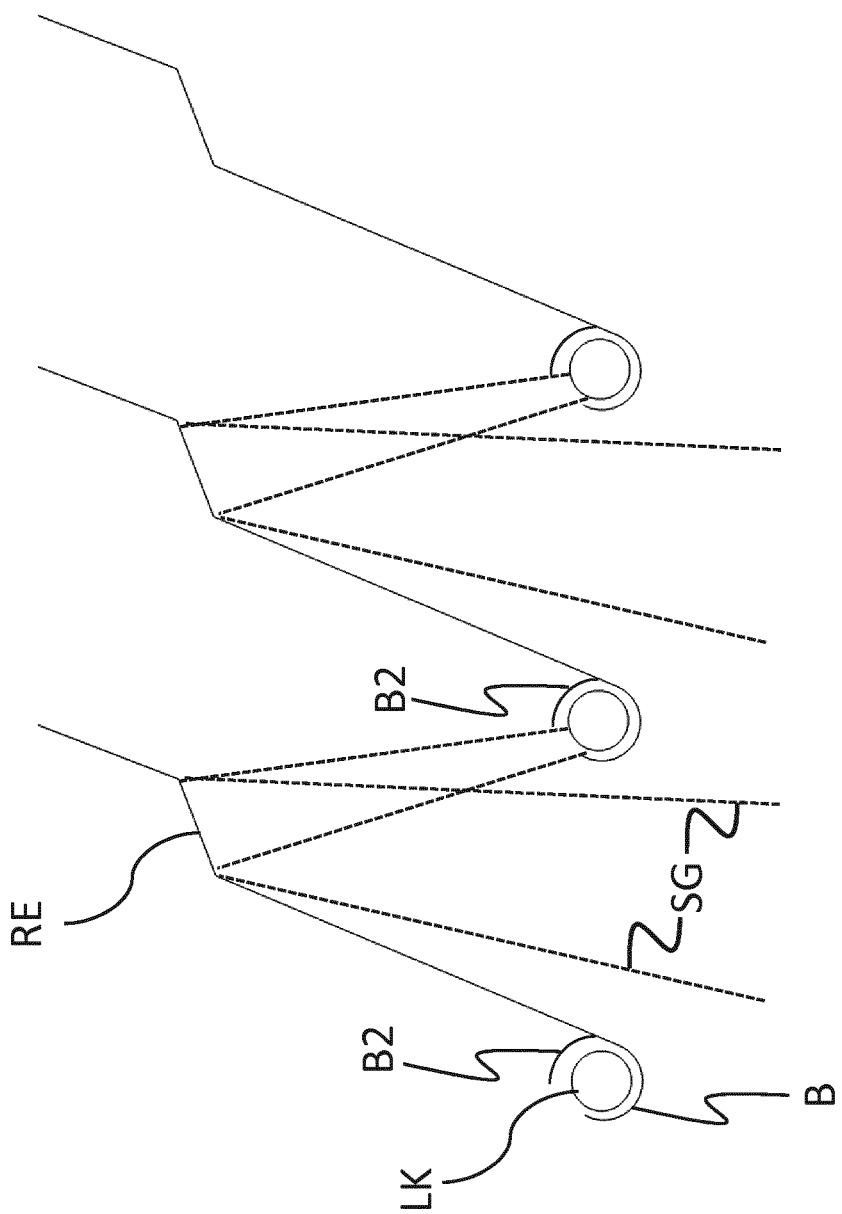

FIG. 5 shows a further improvement of the invention. Here, provision is made of a further baffle B2, which prevents an emission of light in a direction adjacent to the reflector device RE, in addition to the baffle B disposed upstream in the direction of travel.

For manufacturing purposes, provision can be made for the illuminant to be substantially completely enveloped by baffle material at the outset and for some of the baffle material to be removed in a further step, for example by a targeted application of lasers, such that light from an illuminant is emitted in a targeted fashion onto the associated reflector unit through the created slit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    a radiator grille comprising a plurality of spaced apart illuminants;
    a baffle disposed upstream of each illuminant, in a direction of travel; and
    a reflector unit assigned to each illuminant, said reflector unit being configured and arranged such that light of an associated illuminant is reflected, in each case, by the reflector unit so as to be emitted from the motor vehicle to the outside through the radiator grille,
    wherein each reflector unit is arranged behind the associated illuminant in a longitudinal direction of the vehicle and offset in a transverse direction of the vehicle relative to the associated illuminant.

2. The motor vehicle as claimed in claim 1, wherein the plurality of illuminants are configured substantially parallel to one another.

3. The motor vehicle as claimed in claim 2, wherein the baffles and/or the reflector units are configured substantially parallel to one another.

4. The motor vehicle as claimed in claim 1, wherein the baffles and/or the reflector units are configured substantially parallel to one another.

5. The motor vehicle as claimed in claim 1, wherein each illuminant comprises or is formed by a light guide.

6. The motor vehicle as claimed in claim 1, wherein each illuminant comprises or is formed by stripe-shaped OLEDs or LED arrays.

7. The motor vehicle as claimed in claim 1, wherein each baffle is configured and arranged relative to an illuminant such that the illuminant is not visible from the outside, and/or substantially no light of the illuminant is emitted to the outside directly from the illuminant.

8. The motor vehicle as claimed in claim 1, wherein each reflector unit is configured and arranged relative to an illuminant such that light of an illuminant is emitted to the outside indirectly from the vehicle through the radiator grille by virtue of the light of the illuminant being deflected by the associated reflector unit so as to be emitted to the outside through an interstice that lies between the illuminant and an adjacent illuminant.

9. The motor vehicle as claimed in claim 1, wherein the reflector unit assigned to an illuminant and the baffle of an adjacent illuminant are directly connected to one another or integrally formed.

10. The motor vehicle as claimed in claim 1, wherein the baffles and/or the reflector units are configured as air deflectors suitable for guiding air through the radiator grille into an engine compartment of the motor vehicle.

11. The motor vehicle as claimed in claim 1, wherein the radiator grille comprises two partial units, which are arranged symmetrically to one another.

* * * * *